United States Patent [19]

Steydle et al.

[11] 4,029,125
[45] June 14, 1977

[54] SNAP-FITTING PIPE CONNECTING DEVICE

[75] Inventors: Guy Steydle; Bernard Poisson, both of Boulogne-Billancourt, France

[73] Assignees: Regie Nationale des Usines Renault, Hauts de Seine; Automobiles Peugeot, Paris, both of France

[22] Filed: Mar. 4, 1975

[21] Appl. No.: 555,105

[30] Foreign Application Priority Data

Mar. 6, 1974 France .............................. 74.07600
Feb. 3, 1975 France .............................. 75.03216

[52] U.S. Cl. ........................... 137/614.06; 137/315; 251/149.6; 251/149.9; 285/308; 285/DIG. 15
[51] Int. Cl.² ......................................... F16L 29/00
[58] Field of Search ........... 251/89.5, 149.1, 149.6, 251/149.9; 285/308; 137/614.06, 637.1, 637.05

[56] References Cited

UNITED STATES PATENTS

| 477,125 | 6/1892 | Johnson et al. | 251/149.9 |
| 2,568,516 | 9/1951 | Scheiwer | 251/149.6 |
| 3,693,655 | 9/1972 | Frisk | 251/149.9 X |
| 3,885,608 | 5/1975 | Ayres | 251/149.6 X |

*Primary Examiner*—Martin P. Schwadron
*Assistant Examiner*—Richard Gerard
*Attorney, Agent, or Firm*—Fleit & Jacobson

[57] ABSTRACT

The invention relates to a snap-fitting pipe connecting device comprising a body adapted to be secured to the frame structure of a machine, a connecting member proper and a lock bolt, a fluid passage formed in the connecting member having a portion at right angles to the axis of said member. The body of the device constitutes a connecting or distributor box adapted to supply several different fluids. Each connecting member and the bore receiving same in said body comprise specific assembly means inherent thereto to prevent their accidental operation in another bore intended for other connecting members, and vice versa.

2 Claims, 7 Drawing Figures

SNAP-FITTING PIPE CONNECTING DEVICE

The present invention relates to quick- or snap-fitting pipe connecting devices, notably for hydraulic system piping.

Devices consisting generally of a pair of interfitting end pieces adapted to be assembled in mutual axial alignment are already known. These end pieces are locked to each other by means either of an annular row of balls or of a spring-loaded bolt. In all cases the hydraulic fluid is allowed to flow through this connecting device in the longitudinal direction thereof and the efforts of the fluid pressure are transmitted directly to the balls or locking bolt. Since, by construction, the balls bear only through their generatrix and the bolts through a reduced surface area, these devices are characterised by a relatively reduced useful life. Moreover and generally since these devices are provided with internal valve means for sealing the orifices when the parts are uncoupled, very small and therefore fragile components must be used. On the other hand, these valve means are particularly objectionable in that they reduce considerably the cross- sectional passage area available for the fluid and are exposed directly to hammering effects.

It may also be emphasized that all these known devices incorporate spring means for controlling the valve members and that these springs are in direct contact with the fluid to be conveyed. In many instances, these springs break up and their fragments are entrained through the machine or hydraulic system, thus causing considerable damages.

It is the primary object of the present invention to provide a novel snap-fitting connecting devices for pipes which comprises essentially a body adapted to be secured to the frame structure of a machine, a detachable connecting member and a locking member, which avoids the inconveniences set forth in the foregoing while being relatively inexpensive to manufacture. This device is characterised in that the fluid passage through the connecting member consists of a 90° elbow, whereby the fluid is directed into this connecting member at right angles to the axis of the bore in which said detachable connecting member is fitted.

Thus, under no circumstances can the pressure of the fluid flowing through the device exert any effort on the device, since the latter is compensated for by the construction.

Furthermore, this device is remarkable notably in that means capable of sealing the fluid passage are provided inside the body and in said connecting member, and that said sealing means do not restrict in any way the cross-sectional passage area available for the fluid, thus safely protecting the device against internal hammering.

On the other hand, a problem frequently arises when it is desired to support fluids of different composition or kinds (such as compressed air, inert gas, control oil, cutting oil, cooling water, etc. . .) simultaneously to machine tools; another known problem consists, when using a same fluid, to deliver this fluid under different pressures or at various outputs, according to the specific functions devolves to the machine tool components. For obvious reasons, it is more convenient to combine the connecting devices concerning these various fluid circuits into a single body or unit constituting a connecting box. However, any error causing the interconnection of two or more circuits intended for different fluids may have extremely serious consequences not only for the machine tool and its production but also for its operator and neighbouring personnel.

According to another feature characterising this invention and directed to avoid this possibility of faulty connection, it is contemplated that in a snap-fitting pipe connecting device constituting a connecting box for a plurality of different fluid circuits each connecting member and the fitting bore intended therefor in said body comprise specific assembling members inherent thereto and capable of positively preventing the insertion of a given connecting member into a wrong fitting bore, and vice-versa.

According to a preferred form of embodiment of the present invention, the body of the snap-fitting connecting device comprises at the outer end of each bore adapted to receive a connecting member a pair of studs adapted to co-act with a corresponding pair of notches formed in the outer periphery of bearing flanges solid with each sliding socket and each connecting member, each assembly of pairs of studs and pairs of notches being disposed at different angular spacings so that in case of error when fitting certain connecting members the latter cannot be locked in their operative position in said body.

With this arrangement comprising only extremely simple components any connecting error is prevented in a positive fool-proof manner. A clearer understanding of this invention will be had from the following description of typical forms of embodiment thereof given by way of illustration with reference to the attached drawings, in which.

Figure 1:
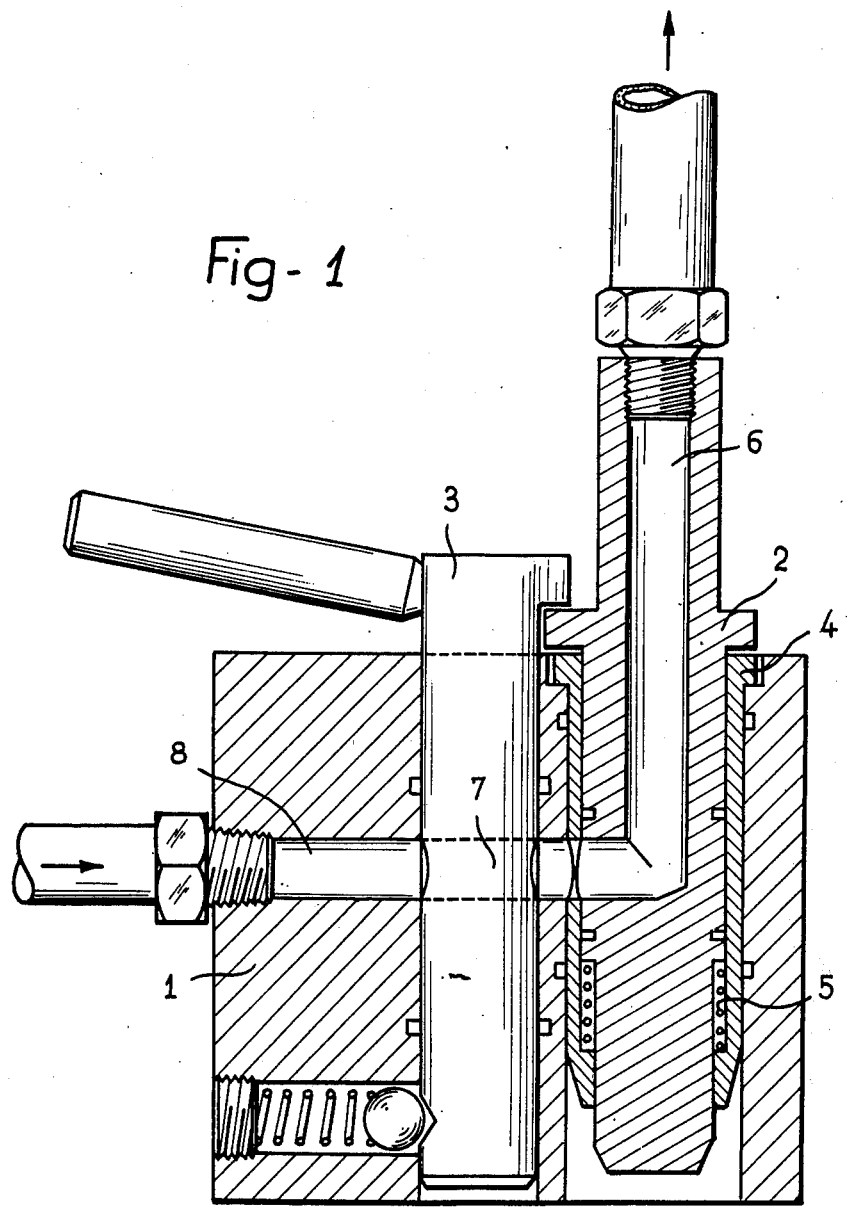
FIG. 1 is a sectional view showing a snapfitting pipe connecting device according to this invention, with the detachable connecting member shown in its locked condition.

The snap-fitting connecting device according to this invention comprises essentially (see FIG. 1) a body 1 adapted to be secured to the fixed structure of a machine, for example a machine tool, and two members, namely a detachable connecting member 2 and a lock bolt or like member 3. In fact, the detachable connecting member 2 is slidably fitted in a socket 4 which, by virtue of a coil compression spring 5 enclosed in an annular chamber formed between said members 2 and 3, is adapted to seal the fluid passage hole 6 extending laterally through the wall of said connecting member. In the operating position of the device a fluid passage hole 7 formed across the bolt 3 registers with said passage hole 6 and thus fluid can flow through the device while the lock bolt 3 retains the connecting member 2 in its operative position. When the lock bolt 3 is rotated to is release position, the connecting member 2 is urged upwards or outwards by said spring 5 and thus the fluid flow is discontinued or cut off.

Figure 2:
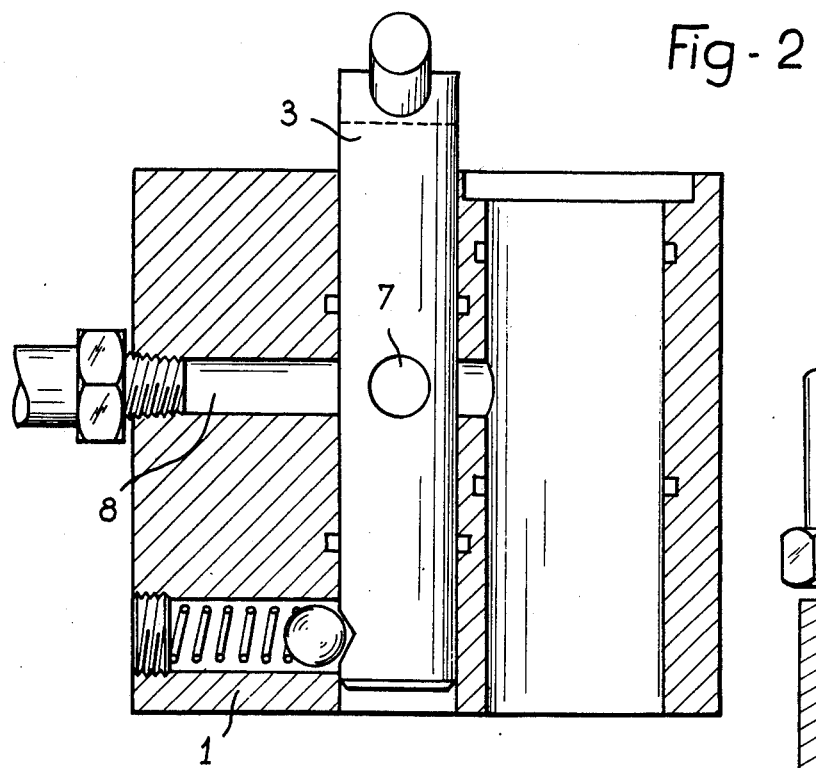
FIG. 2 is a fragmentary sectional view of the snap-fitting connecting device from which the detachable connecting member has been released and separated.
Figure 3:
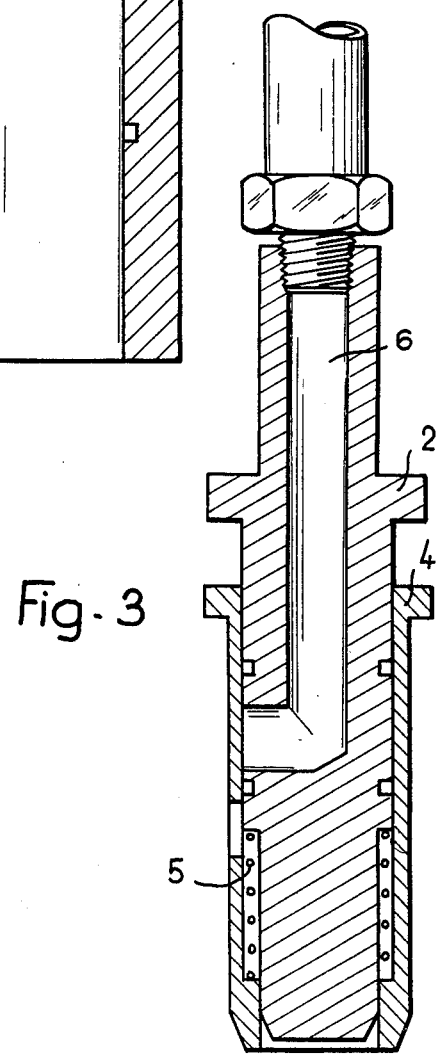
FIG. 3 is a vertical section of the detachable connecting member removed from the body of FIG. 2.

This condition can be seen in FIGS. 2 and 3. Thus, in FIG. 2, it will be seen that when the lock bolt 3 is in its release position, the fluid cannot flow through it and thus no fluid is delivered to or from the connecting member 2. Even if the inlet port 8 (assuming that the fluid flows is to take place mainly in the direction of the arrows in FIG. 1) were under pressure, no force tending to move the lock bolt would in any manner be exerted on this bolt 3.

In FIG. 3, it will also be seen that when the connecting member 2 is released, the socket 4 urged by spring 5 will seal the fluid passage 6 formed in said connecting member 2. Obviously, even if a fluid pressure developed in said passage 6, the sealing socket 4 would not be exposed to any force tending to move same in any direction.

Figure 4:
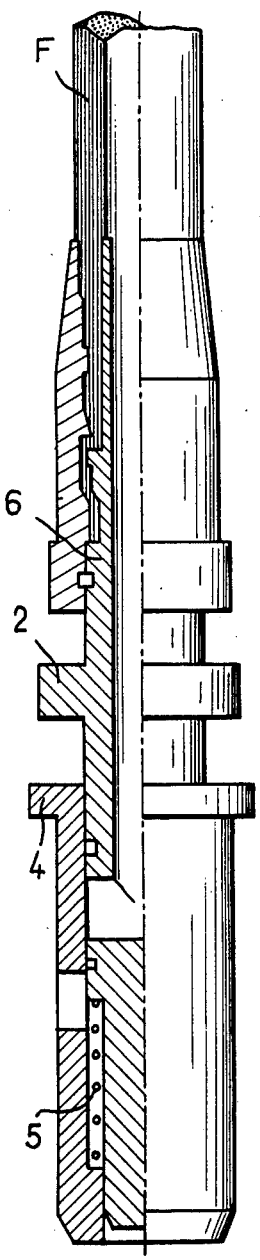
FIG. 4 is a part-sectional view of the mounting of a flexible hose to a detachable connecting member.

FIG. 4 illustrates one manner of fitting this special connecting member directly to the end of a flexible hose F of standard configuration, this arrangement being particularly advantageous in that it permits of dispensing with conventional hose unions or couplings.

Figure 5:
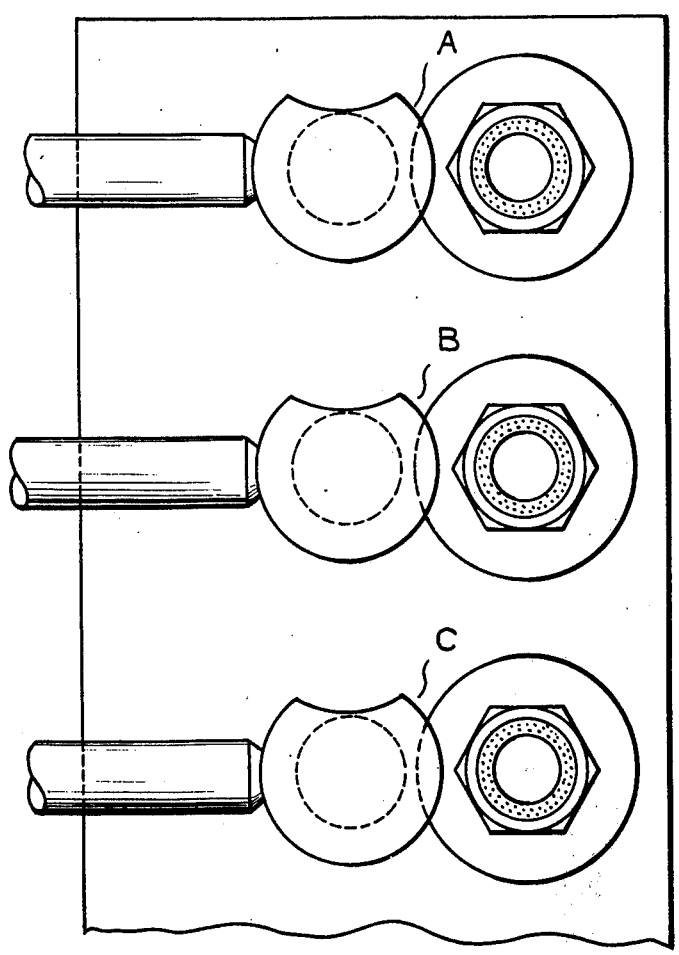
FIG. 5 is a plan top view illustrating a plurality of pipe connections made through snap-fitting devices according to this invention.

This type of connecting device is further advantageous in that a plurality of connecting devices A, B and C for flexible hoses can be combined on a same and common distributor body adapted to be secured to a machine or other structure, as illustrated in FIG. 5.

This snap-fitting connecting device for hydraulic pipings requires but little maintenance because the connecting member 2 of cylindrical male configuration has a smooth external surface, without any projection, thus greatly facilitating the cleaning thereof before fitting same into the bore of socket 4. Also in the case of the body 1, the recess receiving the socket 5 and the connecting member 2 is a plain, easy-cleaned cylindrical bore extending from top to bottom through said body 1 (FIGS. 2 and 3).

Figure 6:
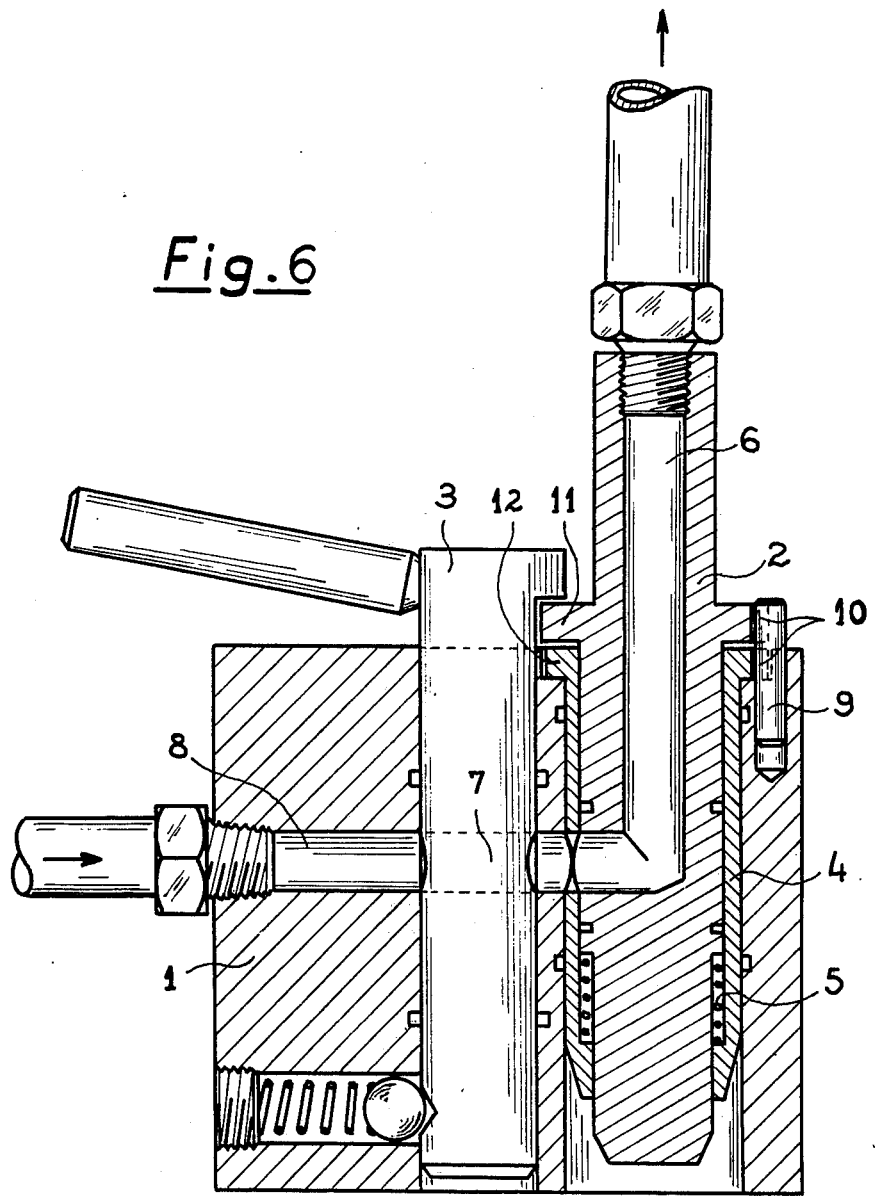
FIG. 6 is a cross section taken along the line VI—VI of FIG. 7, illustrating a snap-fitting connecting device according to this invention, with the detachable connecting member locked therein.
Figure 7:
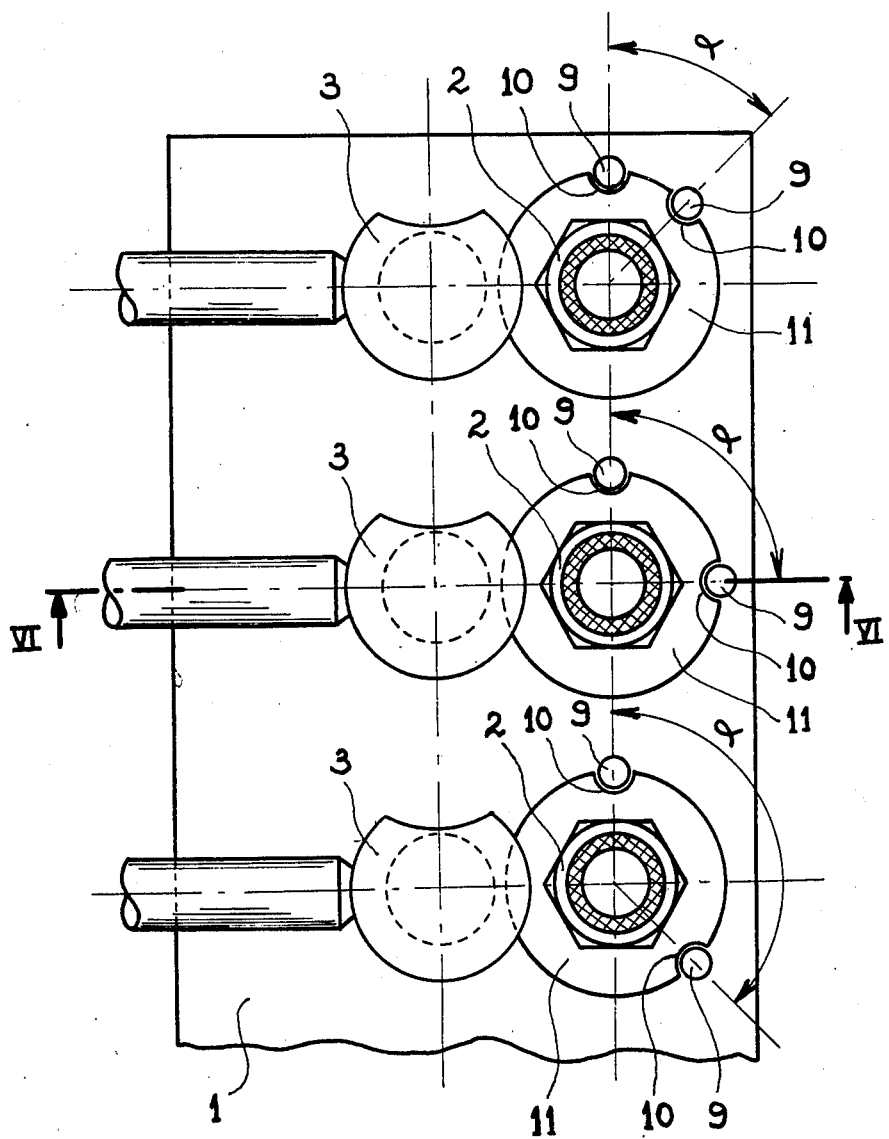
FIG. 7 is a top plan view of the assembly shown in FIG. 6.

The snap-fitting connecting device illustrated in FIGS. 6 and 7 of the drawings consists essentially of a body 1 adapted to be secured for example to the frame structure of a machine, of a connecting member 2 and of a lock bolt 3. As in the preceding examples, the connecting member 2 is surrounded by a socket 4 adapted to be moved by a spring 5 to a position such as to seal the fluid passage 6 when the member 2 is disconnected or released from the body 1. Likewise, the fluid supplied through the inlet port 8 of the body 1 can flow through the bolt 3 only when the latter is positioned to lock the connecting member 2 in its operative position.

According to this specific embodiment of the present invention, the body constituting a distributor box for a plurality of different fluid circuits comprises, at the upper end of each bore adapted to receive an assembly comprising a socket 4 and a connecting member 2, a pair of studs 9 consisting of simple, substantially tapered elements force fitted in corresponding holes formed in said body 1 and adapted, in the operative position of the snap-fitting connecting device, to engage a registering pair of notches 10 formed in the outer peripheral edge of bearing flanges 11 and 12 solid with each sliding socket 4 and each connecting member 2, respectively. Each positioning set comprising a pair of studs 9 and a pair of notches 10 is disposed at a different relative angular spacing $\alpha$, so that if an error is committed, such as inserting one of the connecting members 2 into a wrong bore, the operator will be prevented from fitting said one member 2 home in this bore, and consequently from locking same in its operative position in the body 1.

Of course, the specific forms of embodiment illustrated and described herein should not be construed as limiting the scope of the invention for various modifications and changes may be brought thereto, as will be readily understood by those skilled in the art, without departing from the basic principles of the invention as set forth in the appended claims.

Thus, the studs 9 may be replaced by elements other than those illustrated, for example in the form of an insert secured through any suitable means to the body 1 or elements formed integrally with the main members 1, 2 and 4. Besides, said studs 9 and the corresponding notches 10 may have various or different mating profiles, thus increasing considerably the number of possible combinations, provided that at least two of these profiles can fit into each other when they are set in, or disposed at, the same relative angular spacing.

Finally, the forms of embodiment of FIGS. 6 and 7 are suitable not only for distinguishing from one another a plurality of snap-fitting connecting devices, each adapted to connect a single circuit and mounted at different locations of the frame structure of a machine or like construction, but also for snap-fitting connecting devices of the type illustrated specifically in FIG. 7 and constituting boxes for a plurality of different fluid circuits.

What is claimed as new is:

1. A snap-fitting pipe connecting device especially usable for directing high pressure fluids, said device comprising:

a body having an inlet fluid passage and a cavity arranged perpendicularly and being adapted to be secured to a machine structure;

a connecting member having a fluid passage formed therein and adapted to be inserted into said cavity in said body;

said fluid passage in said connecting member comprising a main section coaxial to said connecting member and a short radial section directed at right angles to said main section and arranged such that upon insertion of said connector into said cavity said radial section is axially aligned with and in communication with said inlet fluid passage whereby upon directing a fluid into said inlet fluid passage no force is exerted in a direction tending to expel said connector from said cavity;

locking means consisting of a socket adapted to slide on the outer surface of said connecting member, spring means for urging said socket, whereby when said connecting member is disconnected from said body into a release position, said socket is moved to a position in which the fluid passage in said connecting member is sealed and when said connecting member is inserted into said cavity in a lock position said socket is moved to a position to permit fluid flow from said inlet fluid passage to said axially aligned radial section; and a rotatable bolt having a fluid passage therein and secured to said body for valving said inlet fluid passage and adapted to lock said connecting member in said lock position and to permit fluid flow through said inlet fluid passage and rotatable to a release position corresponding to said connecting member release position wherein said inlet fluid passage is closed.

2. A snap-fitting connecting device according to claim 1, wherein said spring means is a coil compression spring associated with said socket and whereby when said connecting member is disconnected from said body, said socket urged by said coil compression spring is moved to a position in which the fluid passage in said connecting member is sealed, said latter passage remaining closed in the release position of said connecting member.

* * * * *